United States Patent [11] 3,567,088

| [72] | Inventor | George L. Andersen |
| | | Franklin County, Ohio |
| [21] | Appl. No. | 835,934 |
| [22] | Filed | June 24, 1969 |
| [45] | Patented | Mar. 2, 1971 |
| [73] | Assignee | Colorado Manufacturing Corporation |
| | | Colorado Springs, Colo. |

[54] APPARATUS FOR SHEARING RIGID WALL TUBES
1 Claim, 7 Drawing Figs.
[52] U.S. Cl. .................................................. 225/103,
83/54, 83/169, 83/188, 83/198
[51] Int. Cl. .................................................. B23d 21/00
[50] Field of Search .......................................... 83/54, 188,
198, 169; 225/103, 93

[56] References Cited
UNITED STATES PATENTS
| 2,412,930 | 12/1946 | Walklet ...................... | 83/188X |
| 2,802,530 | 8/1957 | Kaufman ...................... | 83/169 |
| 3,487,668 | 1/1970 | Fuchs, Jr. ...................... | 83/54X |

*Primary Examiner*—James M. Meister
*Attorney*—William S. Rambo

ABSTRACT: A method and apparatus for shearing or breaking a metal tube or the like by confining and supporting the tube on both its inner and outer surfaces and on either side of a given shear plane, and then applying a shear force to the supported tube sufficient to break it transversely along the shear plane.

PATENTED MAR 2 1971 3,567,088

INVENTOR.
GEORGE L. ANDERSEN
BY
Mahoney, Miller & Rambo, Attys.

INVENTOR.
GEORGE L. ANDERSEN
BY
Mahoney, Miller & Rambo, Attys.

APPARATUS FOR SHEARING RIGID WALL TUBES

BACKGROUND OF THE INVENTION

This invention relates generally to methods and means for severing metal or other rigid wall tube stock to form therefrom a number of shorter tubular increments or annular workpieces.

In the past, tubular or annular metal workpieces used in making metal forgings and extrusions have generally been cut either on a lathe, or by a saw, or by a rotary pipe cutter, or by a torch from relatively long lengths of tube stock. Cutting of metal tube stock by any of these prior methods is both time-consuming and wasteful from the standpoint of the percentage of material lost through such cutting operations.

Heretofore, known attempts to shear or otherwise break a tube along a transverse plane have met with little or no success, due to the collapse and deformation of the tube walls in the region of shear plane.

SUMMARY AND OBJECTS OF THE INVENTION

According to the present invention, satisfactory and readily useable tubular workpieces and/or annular slugs may be obtained by shearing or transversely breaking an end portion from a relatively elongated metal pipe or similar tubular metal stock, simply by supporting the tube stock on both its inner and outer wall surfaces and for a distance on either side of a given shear plane while subjecting the tube stock to a shear force sufficient to break it transversely along the selected shear plane.

The primary object of this invention is to provide an economical, expeditious, and efficient method of shearing rigid wall metal tubing to form therefrom tubular or annular workpieces or slugs which may be forged, extruded, or otherwise worked into a finished metal product.

Another object is to provide an apparatus or machine for shearing a rigid wall tube which comprises many of the components common to machines for shearing solid metal bars and the like, but which also incorporates means for plugging, filling, or otherwise supporting the inner wall of the tube during the application of shear forces thereto.

DESCRIPTION OF PREFERRED EMBODIMENTS

The words "tube " and "tubular," as used herein, are intended to refer to and include hollow bodies of polygonal shape as well as curvilinear cross section, e.g. square, rectangular, hexagonal, cylindrical, elliptical, etc.

Figure 1:
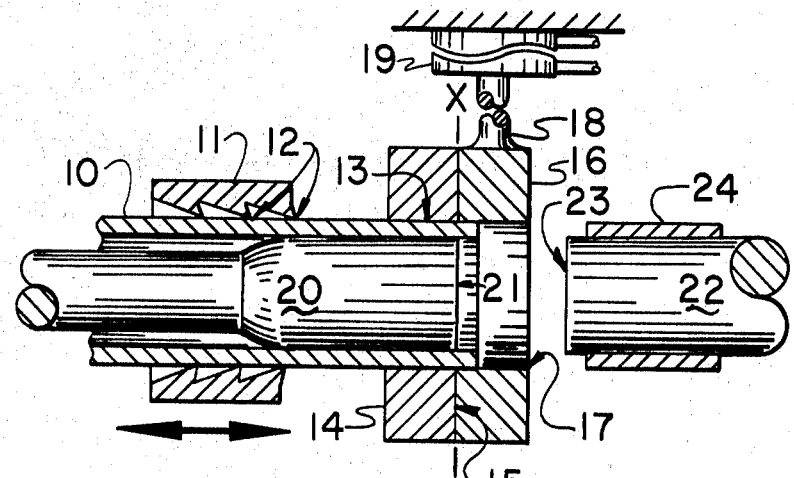
FIGS. 1, 2 and 3 are diagrammatic cross-sectional views of one form of tube-shearing apparatus according to the present invention and showing the sequence of steps involved in the method of this invention.
Figure 2:
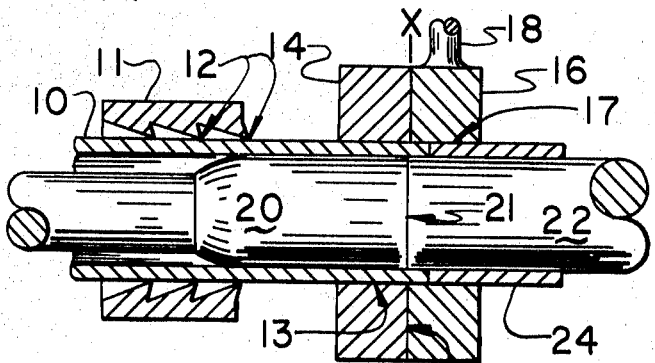
Figure 3:
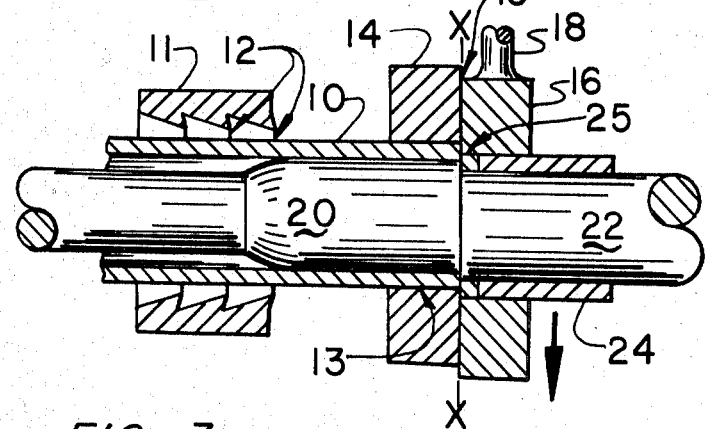
Figure 4:
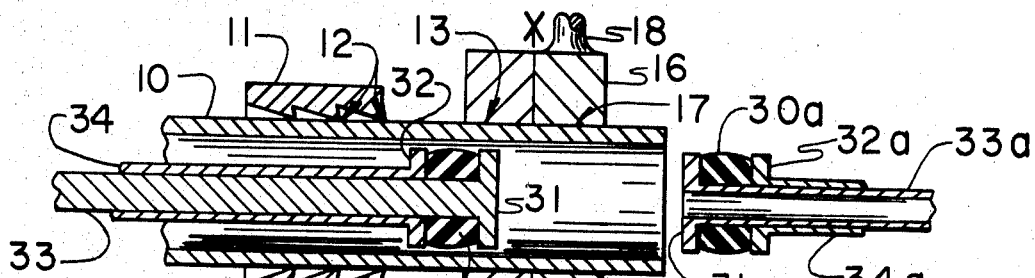
FIGS. 4 through 7 are similar views, but showing a modified form of apparatus according to this invention.

Referring now to the drawings, and particularly FIGS. 1—3, the reference numeral 10 designates an elongated, rigid wall, cylindrical tube of metallic composition, such as steel. The tube 10 is arranged to be fed or advanced axially and incrementally by means of a reciprocating stock feeder 11. The stock feeder 11 is in the nature of a cylindrical sleeve which is formed on its inner wall surface with a plurality of annular, barblike ribs or teeth 12 arranged to engage and move the tube when the feeder moves in one direction (to the right as viewed in FIGS. 1—3), but to slide over the outer surface of the tube when reciprocated in the opposite direction. The feeder 11 may be reciprocated or driven by any suitable driving mechanism, not shown.

The tube 10 and feeder 11 are disposed in axial alignment with a cylindrical opening, bore, or socket 13 formed in a relatively stationary or fixed blade or die member 14. The opening or socket 13 of the fixed blade member 14 is shaped and sized to closely but slidably receive the outer surface of the tube 10 when the outer end portion of the tube is advanced therein by the feeder 11. The fixed blade member 14 terminates at one end thereof in a flat, planar end face 15 which lies along and defines a shear plane X–X disposed in perpendicular relation to the axis of the socket 13 and the tube 10. Disposed in closely adjacent, sliding engagement with the end face 15 of the fixed blade member 14, is one end face of a relatively movable blade or die member 16 having a bore, opening, or socket 17 extending axially therethrough. The movable blade member 16 is arranged for reciprocation in a plane perpendicular to the axis of its opening or socket 17, and toward this end, the blade member 16 may be connected with the piston rod 18 of a hydraulic cylinder-piston-type press 19 (FIG. 1), or the ram of a mechanical press.

Extending coaxially within the tube 10 is a solid mandrel section 20 which conforms closely to the inner wall surfaces of the tube and which substantially fills the inner chamber or void of the tube 10 in the region of the stationary blade member 14. The mandrel section 20 terminates in a flat end face 21 disposed in close adjacency to the shear plane X–X between the blade members 14 and 16. Any appropriate indexing means, not shown, may be employed to place and maintain the end face 21 of the mandrel section 20 in desired relation to the shear plane X–X. Associated with the movable blade 16 is a second, movable mandrel section 22 having a planar end face 23 which may be moved into and out of abutting, axial alignment with the end face 21 of the mandrel section 20 and into or closely adjacent the shear plane X–X. The movable mandrel section 22 preferably carries thereon a slidable pilot sleeve 24 having substantially the same diametric and wall thickness dimensions as the tube 10. The pilot sleeve 24 is arranged to closely fit within the opening or socket 17 of the movable blade member 16 when the movable mandrel section 22 is moved axially into engagement with the mandrel section 20, to thereby stabilize and prevent axial cocking or tilting of the mandrel section 22 during shearing of the first two or three annular segments from the end portion of the tube 10. As will be readily apparent to those having ordinary skill in the machine tool art, the movable mandrel section 22, as well as the relatively stationary mandrel section 20, may be connected with and supported by any suitable indexing or positioning means, not shown, which lend themselves to automatic operation in association with the sequential operations of the movable blade member 16 and the stock feeder 11. It will also be appreciated that the mandrel sections and pilot sleeve 24 may be moved and positioned manually if desired.

In the operation of the apparatus shown in FIGS. 1—3, the movable blade member 16 is moved or adjusted to its normal position of rest where its opening or socket 17 is disposed in axial alignment with the opening or socket 13 of the relatively stationary blade member 14, as shown in FIG. 1. The mandrel section 20 is then positioned to bring its planar end face 21 into or closely adjacent the shear plane X–X. The stock feeder 11 is then actuated to advance the tube 10 axially to a point where its outer end portion projects a distance beyond the shear plane X–X equal to the desired thickness or axial length of a workpiece to be sheared from the tube. The movable mandrel section 22 with its pilot sleeve 24 are then moved axially into the opening 17 of the movable blade member 16 to occupy the positions shown in FIG. 2. In this latter position, the end portion of the mandrel section 22 telescopes within the outer end of the tube 10 a distance equal to the axial length of the workpiece or segment to be sheared from the tube. The end face 23 of the mandrel section 22 is disposed in abutting engagement with the end face 21 of the mandrel section 20 along the shear plane X–X. The end of the pilot sleeve 24 butts against the outer end surface of the tube 10. The press 19 is now actuated so as to forcibly move the movable blade member 16 downwardly to the position shown in FIG. 3. As the movable blade member 16 is forced downwardly, the movable mandrel section 22 and the sleeve 24 move with it to thus place the end portion of the tube 10 in shear. As the movable blade member 16 moves toward the position shown in FIG. 3, that portion of the tube 10 lying within the movable blade member 16 is sheared or broken transversely from the remaining body portion of the tube to form an annular tubular segment or slug 25. Following the shearing stroke, the movable blade member 16 is returned to its normal rest position as shown in FIGS. 1 and 2, in which position the sheared segment or slug 25 may be removed axially from the mandrel section 22, or may be left on the mandrel section 22 to accumulate with other successively sheared segments. In either event, the stock feeder 11 is again actuated to advance another segment of the tube 10 into the opening 17 of the movable blade member 16. If the movable mandrel section 22 has been removed from the movable blade member 16 it is then replaced to the position shown in FIG. 2 and a second shearing stroke is accomplished by energizing the hydraulic press 19. However, it is unnecessary to retract or remove the mandrel section 22 from the movable blade member 16 following each shearing stroke of the machine. Rather, it is preferable to permit a number of the sheared segments 25 to accumulate on the mandrel section 22. In this regard, it will be apparent that upon each successive operation of the feeder mechanism 11, the outer end portion of the tube 10 will incrementally displace a previously sheared segment or slug 25 axially along the movable mandrel section 22. At the same time, the pilot sleeve 24 will also be displaced axially along the mandrel section 22 and outwardly from the opening 17 of the movable blade member 16 by the successively sheared segments or slugs 25. However, at this point in the operation of the apparatus, the sleeve 24 is no longer needed since the accumulated segments 25 will perform the desired function of stabilizing the movable mandrel section 22 within the opening 17 of the movable blade member 16 during the shearing stroke.

Figure 5:
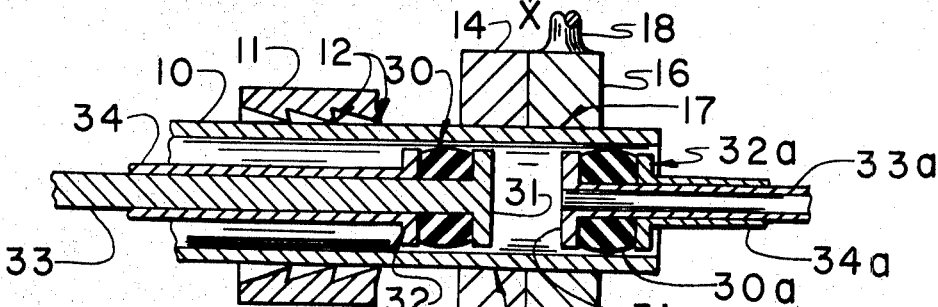
Figure 6:
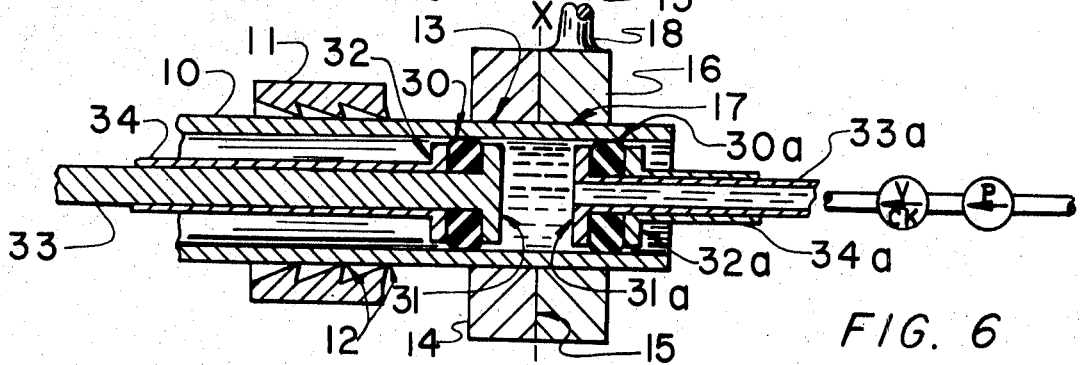
Figure 7:
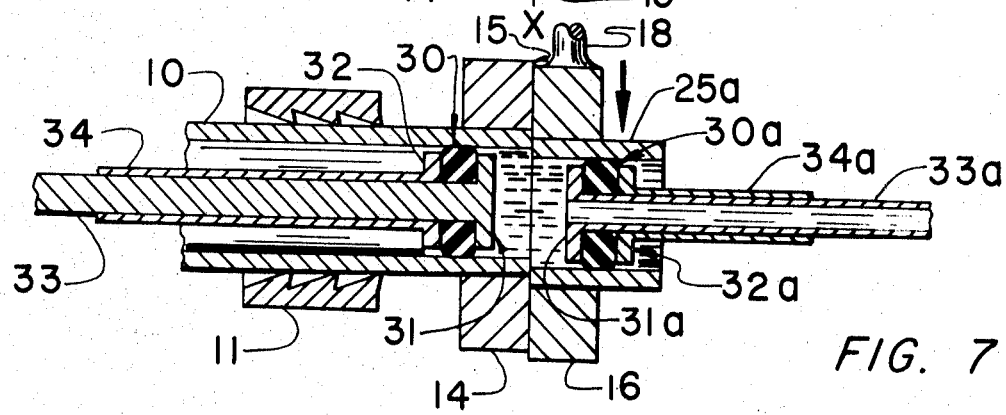

FIGS. 4—7 of the drawings illustrate a slightly modified apparatus and method of plugging, or filling the inner chamber or void of the tube 10 preparatory to and during the shearing operation. In lieu of the solid mandrel sections 20 and 22, fluid pressure means is employed to substantially solidify and support the inner wall surface of the tube for a distance on either side of the shear plane X–X during the shearing stroke. Toward this end, a first radially expansible, hydraulic dam or seal is provided within the tube 10 in the region of the stationary blade member 14. This first seal comprises an annulus 30 of resiliently compressible, elastomeric composition which is sandwiched between a pair of relatively opposed and movable heads 31 and 32 carried, respectively, on an elongated rod or shaft 33 and a coaxial, slidable sleeve or hollow shaft 34. As will be noted from the drawings, the inner rod or shaft 33 and outer sleeve 34 extend coaxially through the tube 10 to a point adjacent the stationary blade member 14. The diameter of the relatively opposed heads 31 and 32 is slightly less than the inner diameter of the tube 10, and in its relaxed or uncompressed condition the diameter of the annulus 30 is also less than the inner diameter of the tube 10. However, as shown in FIGS. 6 and 7, the sleeve 34 and its associated head 32 may be moved axially on the rod or shaft 33 in a direction toward the head 31, so as to axially compress and radially expand the annulus 30 into fluid-tight, sealing engagement with the inner wall of the tube 10.

Arranged for axial insertion into the outer end of the tube 10 is a second hydraulic dam or barrier which is substantially identical in construction and function to the previously described hydraulic dam, except that the inner rod or shaft 33a is hollow and serves as a conduit to conduct liquid under pressure to the inner chamber of the tube 10 between the two hydraulic dams. Connected with the conduit shaft 33a is a hydraulic pump P and a check valve V (see FIG. 6) which is arranged to permit the flow of liquid from the pump P toward the inner chamber of the tube 10, but to prevent flow in the opposite direction.

In the operation of the modified tube-shearing apparatus of FIGS. 4—7, the tube 10 is advanced axially by the feeder mechanism 11 through the aligned openings 13 and 17 of the blade members 14 and 16, so as to place the outer end portion of the tube 10 the desired distance beyond the shear plane X–X. The hydraulic dams or seals are then positioned in the tube in relatively spaced-apart, opposed relation on either side of the shear plane X–X, as shown in FIG. 5. The slidable sleeves 34 and 34a are then moved axially on the shafts 33 and 33a, so as to compress and radially expand the annuli 30 and 30a into tight sealing engagement with the inner wall of the tube 10, as shown in FIG. 6. Next, liquid under pressure is introduced by way of the conduit shaft 33a into the sealed pressure chamber formed within the tube 10 between the two hydraulic dams. Once pressurized, the liquid will remain under pressure within the chamber of the tube due to the presence of the check valve V. The movable blade member 16 is then moved in its shearing stroke (FIG. 7) to shear the tubular end segment 25a from the remainder of the tube 10. Upon fracture or shearing of the tube wall, pressure exerted by the liquid within the previously sealed chamber of the tube will be relieved by the sudden escape of pressurized liquid or vapor between the adjacent end faces of the blade members 14 and 16. Following the shearing stroke, the movable blade member 16 is returned to its normal rest position and the sealing annuli 30 and 30a are released from the tube 10 and the sheared segment 25a. The right-hand hydraulic dam or seal is then removed axially from the severed segment 25a to discharge the segment from the shearing apparatus and condition the apparatus for a succeeding shearing operation.

In view of the foregoing, it will be apparent that the present invention provides an improved and mechanically efficient method and means for shearing metal and other rigid wall tubes in substantially the same manner as heretofore employed in shearing or breaking solid rod or bar stock. By plugging or filling the inner chamber or void of the tube in the region of the shear plane, and thereby supporting the tube both its inner and outer surfaces, the tube may be sheared or transversely broken without collapse or appreciable distortion.

While presently preferred embodiments of the invention have been illustrated and described by way of example, it will be understood that various modifications as to details of construction and design may be resorted to without departing from the spirit of the invention or the scope of the following claims.

I claim:

1. In a machine for shearing a rigid wall tube:
   a. a pair of closely adjacent, relatively slidable members having openings therein arranged normally in relative axial alignment and shaped to closely fit the outer wall surfaces of a tube inserted in said openings;
   b. means for plugging and supporting the inner wall surface of such a tube comprising a pair of outwardly expansible, hydraulic barriers movable axially within such tube and operable to define therein a hydraulic pressure chamber within the region of said members; and
   c. means connected with one of said members for sliding it relative to the other of said members in a plane transverse to the axes of said openings and for a distance sufficient to shear a tube inserted in said openings.